US012683881B2

(12) United States Patent
Zhu et al.

(10) Patent No.: US 12,683,881 B2
(45) Date of Patent: Jul. 14, 2026

(54) DELAY MEASUREMENT METHOD AND APPARATUS, STORAGE MEDIUM AND PROGRAM PRODUCT

(71) Applicant: ZTE Corporation, Shenzhen (CN)

(72) Inventors: Xiangyang Zhu, Shenzhen (CN);
Jinghai Yu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 52 days.

(21) Appl. No.: 18/847,655

(22) PCT Filed: Jan. 19, 2023

(86) PCT No.: PCT/CN2023/073243
§ 371 (c)(1),
(2) Date: Sep. 16, 2024

(87) PCT Pub. No.: WO2023/231426
PCT Pub. Date: Dec. 7, 2023

(65) Prior Publication Data
US 2025/0202790 A1 Jun. 19, 2025

(30) Foreign Application Priority Data

Jun. 2, 2022 (CN) .......................... 202210621929.0

(51) Int. Cl.
*H04L 43/0852* (2022.01)
*H04J 3/06* (2006.01)
*H04L 43/106* (2022.01)

(52) U.S. Cl.
CPC ........ *H04L 43/0858* (2013.01); *H04J 3/0673* (2013.01); *H04L 43/106* (2013.01)

(58) Field of Classification Search
None
See application file for complete search history.

(56) References Cited

U.S. PATENT DOCUMENTS

| 6,545,979 B1 | 4/2003 | Poulin |
| 8,254,272 B1 * | 8/2012 | Vasseur ............... H04L 41/0677 |
| | | 370/248 |

(Continued)

FOREIGN PATENT DOCUMENTS

| CN | 1812350 A | 8/2006 |
| CN | 102036127 A | 4/2011 |

(Continued)

OTHER PUBLICATIONS

First Office Action and Search Report for Chinese Application No. 202210621929.0, dated Aug. 9, 2025.

(Continued)

*Primary Examiner* — Jason D Cardone
(74) *Attorney, Agent, or Firm* — Wolf, Greenfield & Sacks, P.C.

(57) ABSTRACT

A delay measurement method and apparatus, a storage medium and a program product are disclosed. The delay measurement method may include: acquiring target time information carried by a first delay measurement packet, the target time information including first time information filled by an intermediate node on a transmission path and second time information filled by a destination node on the transmission path; acquiring an accumulative one-way link delay from a source node to the destination node according to the first time information and the second time information; and transmitting a second delay measurement packet including the accumulative one-way link delay to the destination node, so that the destination node acquires a one-way delay from the source node to the destination node according to the accumulative one-way link delay.

19 Claims, 9 Drawing Sheets

(56)  References Cited

U.S. PATENT DOCUMENTS

| | | | | |
|---|---|---|---|---|
| 2014/0043987 A1* | 2/2014 | Watve | H04L 41/5019 | |
| | | | | 370/252 |
| 2016/0036555 A1* | 2/2016 | Hua | H04L 7/0075 | |
| | | | | 398/52 |
| 2016/0112182 A1* | 4/2016 | Karnes | G06F 1/14 | |
| | | | | 375/362 |
| 2016/0337062 A1* | 11/2016 | Ruffini | H04J 3/0667 | |
| 2017/0150464 A1* | 5/2017 | Kazehaya | H04L 12/422 | |
| 2018/0270144 A1* | 9/2018 | Jiang | H04L 43/0852 | |
| 2021/0203596 A1* | 7/2021 | Kini | H04L 41/0816 | |
| 2021/0356985 A1 | 11/2021 | Wei | | |
| 2023/0246723 A1* | 8/2023 | Tzeng | H04J 3/0697 | |
| | | | | 370/503 |

FOREIGN PATENT DOCUMENTS

| | | | |
|---|---|---|---|
| CN | 107508719 A | 12/2017 | |
| CN | 108111365 A | 6/2018 | |
| CN | 110691407 A | 1/2020 | |
| CN | 113992297 A | 1/2022 | |

OTHER PUBLICATIONS

PCT/CN2023/073243, Apr. 27, 2023, International Search Report and Written Opinion.

International Search Report and Written Opinion for International Application No. PCT/CN2023/073243, mailed Apr. 27, 2023.

* cited by examiner

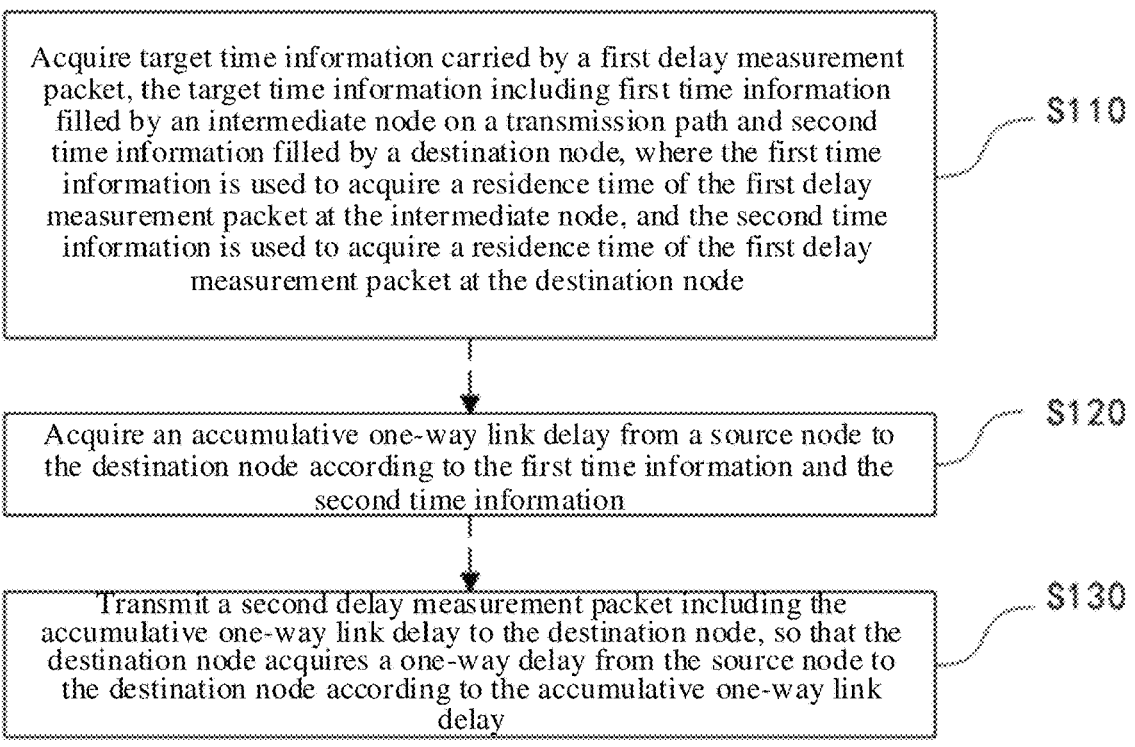

Acquire target time information carried by a first delay measurement packet, the target time information including first time information filled by an intermediate node on a transmission path and second time information filled by a destination node, where the first time information is used to acquire a residence time of the first delay measurement packet at the intermediate node, and the second time information is used to acquire a residence time of the first delay measurement packet at the destination node — S110

Acquire an accumulative one-way link delay from a source node to the destination node according to the first time information and the second time information — S120

Transmit a second delay measurement packet including the accumulative one-way link delay to the destination node, so that the destination node acquires a one-way delay from the source node to the destination node according to the accumulative one-way link delay — S130

FIG. 1

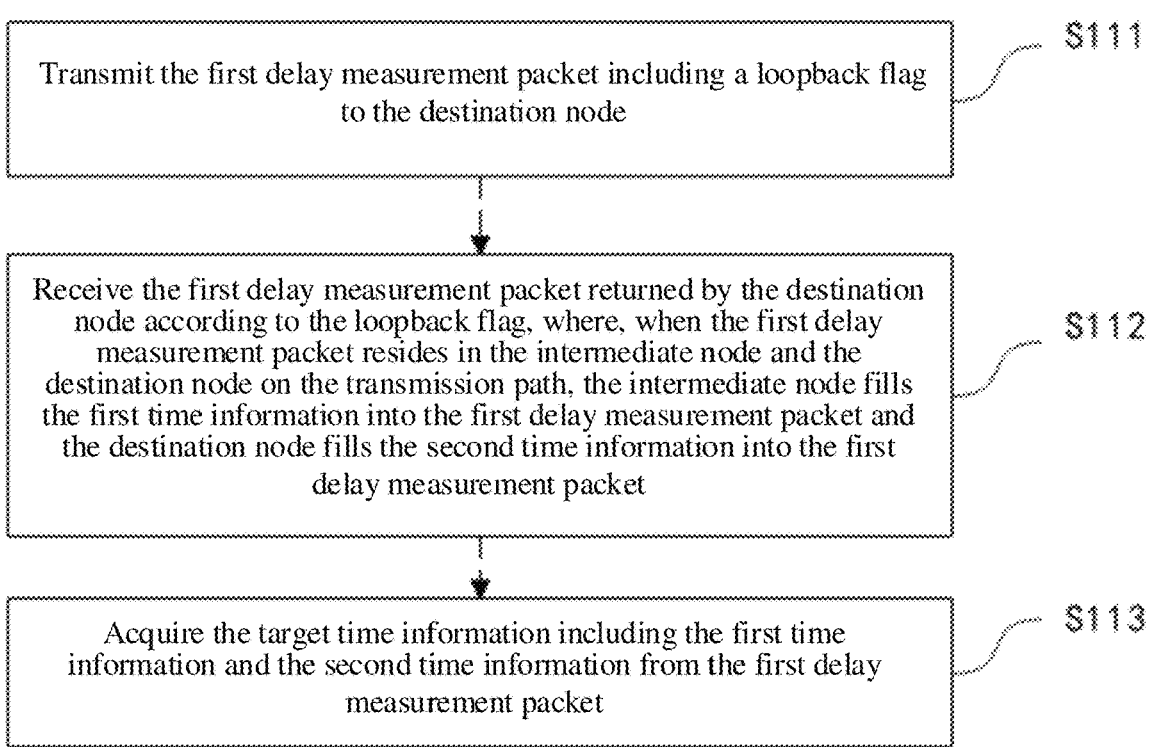

Transmit the first delay measurement packet including a loopback flag to the destination node — S111

Receive the first delay measurement packet returned by the destination node according to the loopback flag, where, when the first delay measurement packet resides in the intermediate node and the destination node on the transmission path, the intermediate node fills the first time information into the first delay measurement packet and the destination node fills the second time information into the first delay measurement packet — S112

Acquire the target time information including the first time information and the second time information from the first delay measurement packet — S113

FIG. 2

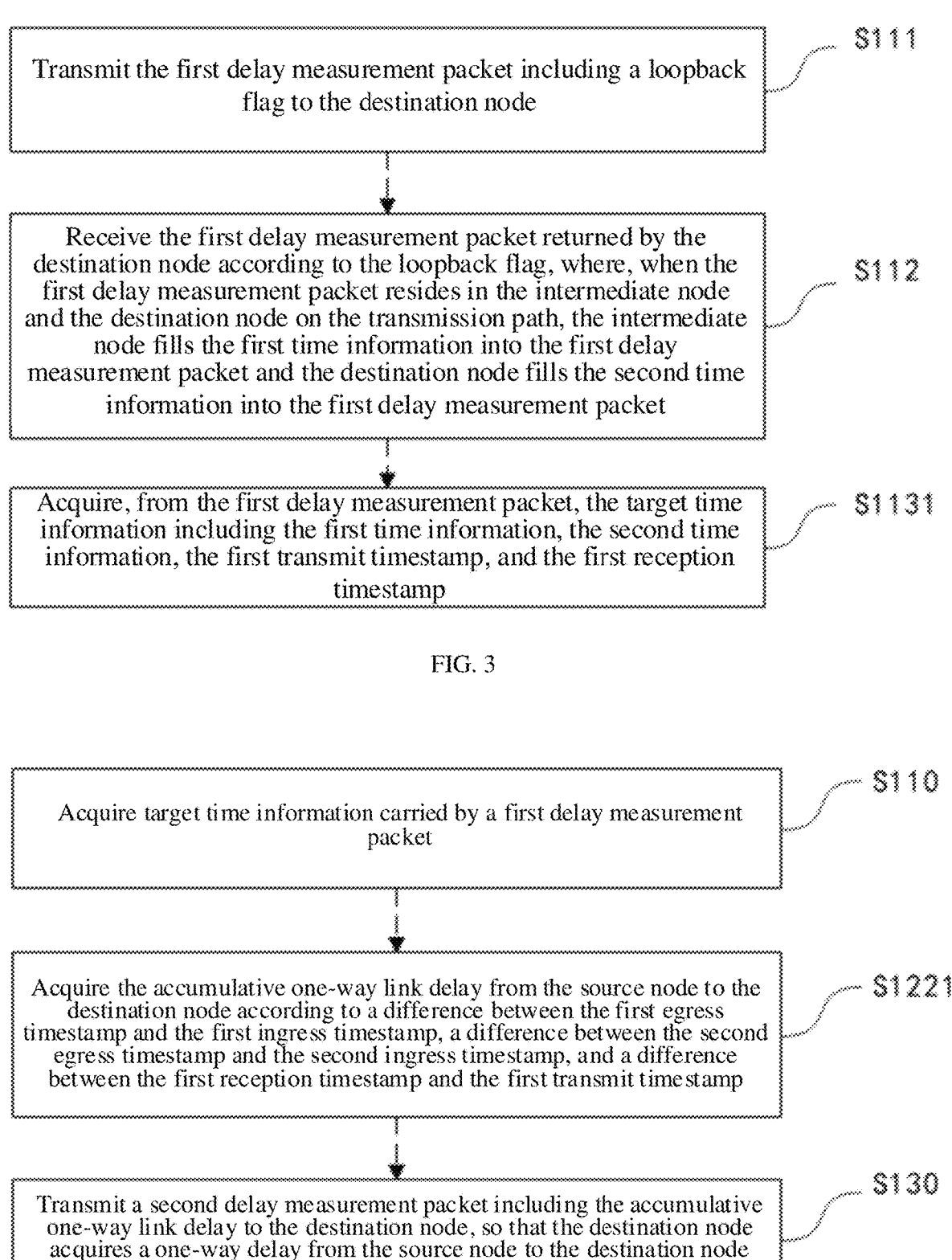

Transmit the first delay measurement packet including a loopback flag to the destination node
— S111

Receive the first delay measurement packet returned by the destination node according to the loopback flag, where, when the first delay measurement packet resides in the intermediate node and the destination node on the transmission path, the intermediate node fills the first time information into the first delay measurement packet and the destination node fills the second time information into the first delay measurement packet
— S112

Acquire, from the first delay measurement packet, the target time information including the first time information, the second time information, the first transmit timestamp, and the first reception timestamp
— S1131

FIG. 3

Acquire target time information carried by a first delay measurement packet
— S110

Acquire the accumulative one-way link delay from the source node to the destination node according to a difference between the first egress timestamp and the first ingress timestamp, a difference between the second egress timestamp and the second ingress timestamp, and a difference between the first reception timestamp and the first transmit timestamp
— S1221

Transmit a second delay measurement packet including the accumulative one-way link delay to the destination node, so that the destination node acquires a one-way delay from the source node to the destination node according to the accumulative one-way link delay
— S130

FIG. 4

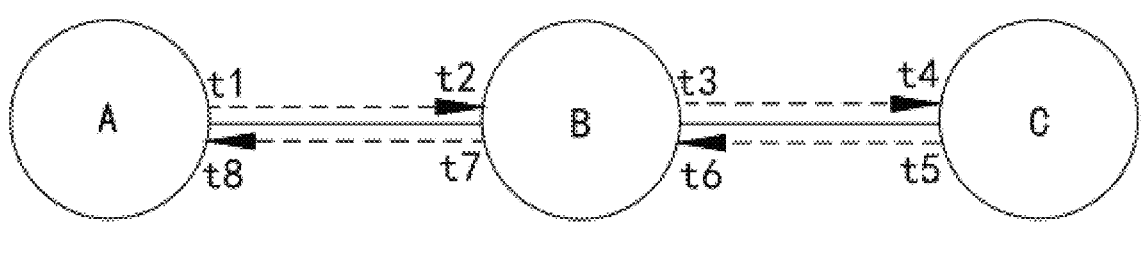
FIG. 5
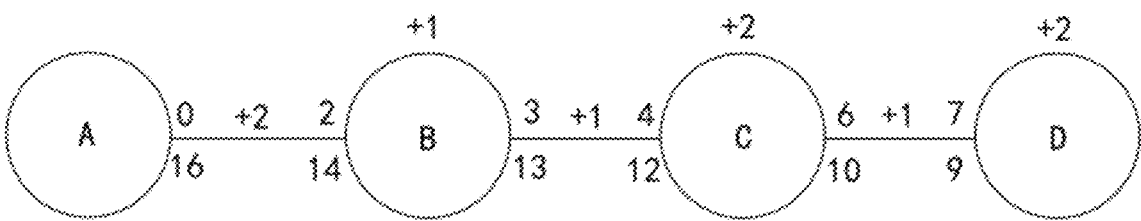
FIG. 6
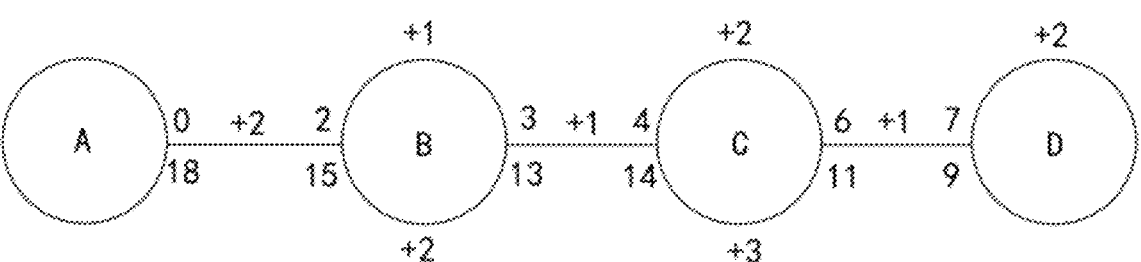
FIG. 7
---
Acquire a second transmit timestamp and a second reception timestamp     S123
Acquire the accumulative one-way link delay from the source node to the destination node according to the second transmit timestamp, the second reception timestamp, the first time information, and the second time information     S124
FIG. 8

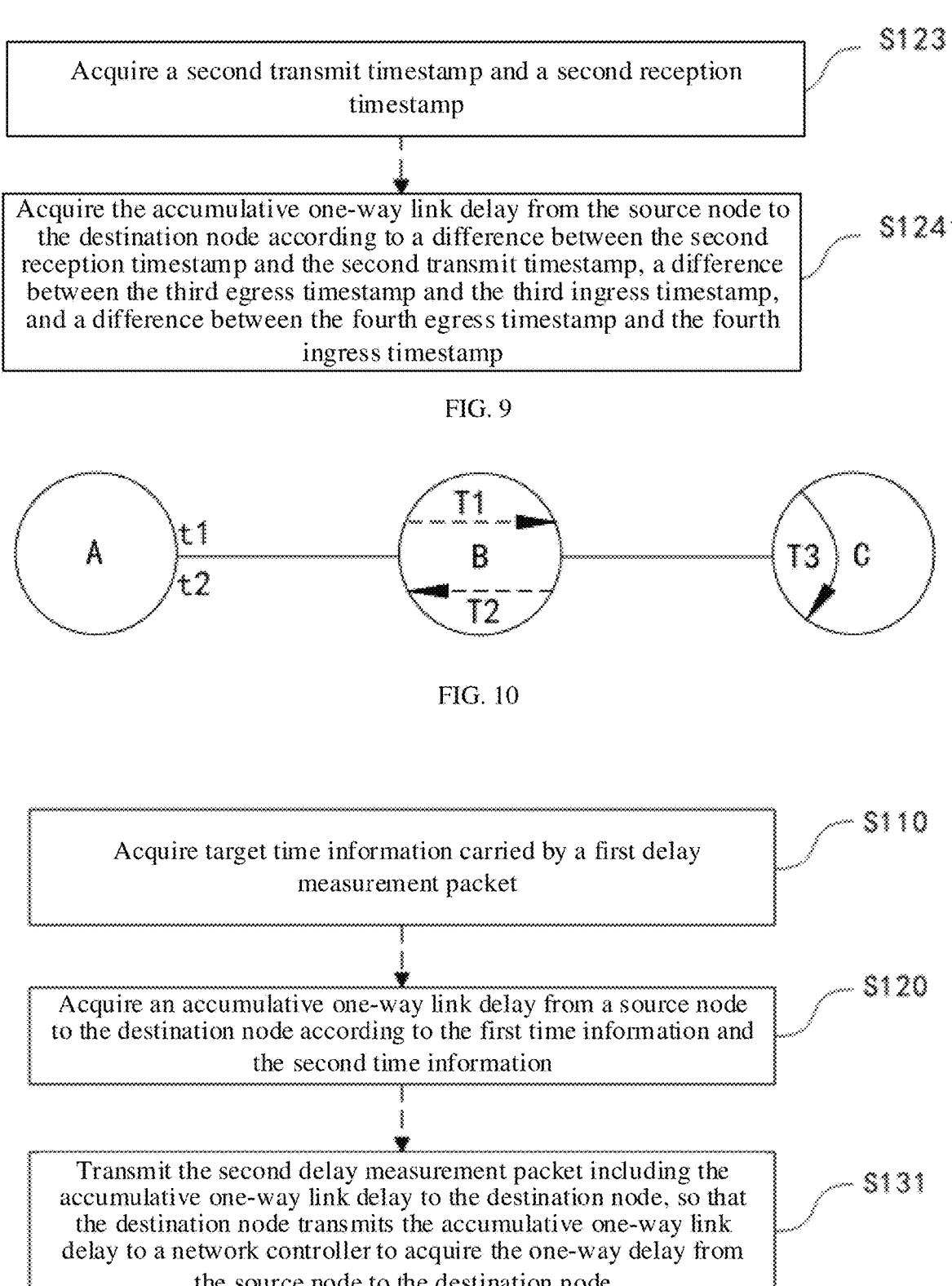

```
┌────────────────────────────────────────────────────┐
│  Acquire a second transmit timestamp and a second  │     S123
│  reception timestamp                                │
└────────────────────────────────────────────────────┘
                         │
                         ▼
┌────────────────────────────────────────────────────┐
│  Acquire the accumulative one-way link delay from  │
│  the source node to the destination node according │
│  to a difference between the second reception       │    S1241
│  timestamp and the second transmit timestamp, a    │
│  difference between the third egress timestamp and  │
│  the third ingress timestamp, and a difference      │
│  between the fourth egress timestamp and the fourth│
│  ingress timestamp                                  │
└────────────────────────────────────────────────────┘
```

```
┌────────────────────────────────────────────────────┐
│  Acquire target time information carried by a first│     S110
│  delay measurement packet                           │
└────────────────────────────────────────────────────┘
                         │
                         ▼
┌────────────────────────────────────────────────────┐
│  Acquire an accumulative one-way link delay from a │
│  source node to the destination node according to  │    S120
│  the first time information and the second time     │
│  information                                        │
└────────────────────────────────────────────────────┘
                         │
                         ▼
┌────────────────────────────────────────────────────┐
│  Transmit the second delay measurement packet       │
│  including the accumulative one-way link delay to   │
│  the destination node, so that the destination node │    S131
│  transmits the accumulative one-way link delay to a │
│  network controller to acquire the one-way delay    │
│  from the source node to the destination node       │
└────────────────────────────────────────────────────┘
```

FIG. 11

| | |
|---|---|
| Generate a second delay measurement packet including an accumulated delay field | S132 |

| | |
|---|---|
| Fill the cumulative one-way link delay into the accumulative delay field | S133 |

| | |
|---|---|
| Transmit the second delay measurement packet including the accumulative delay field to the destination node, so that the destination node acquires a one-way delay from the source node to the destination node according to information in the accumulative delay field, where, when the second delay measurement packet resides in a node on the transmission path, the node accumulates a residence time of the second delay measurement packet into the accumulative delay field | S134 |

FIG. 12

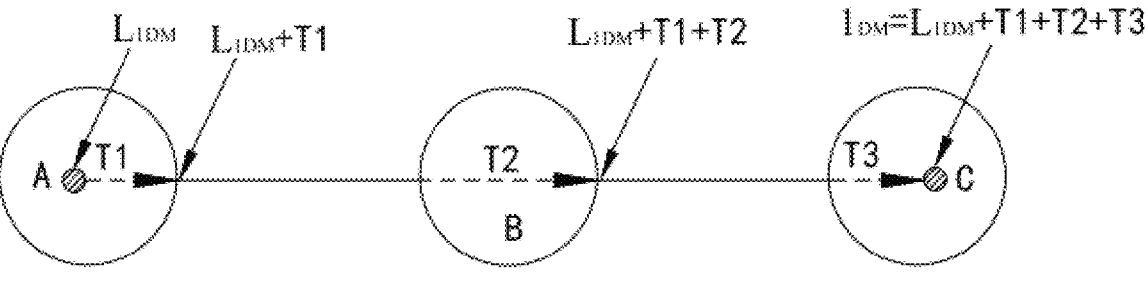

FIG. 13

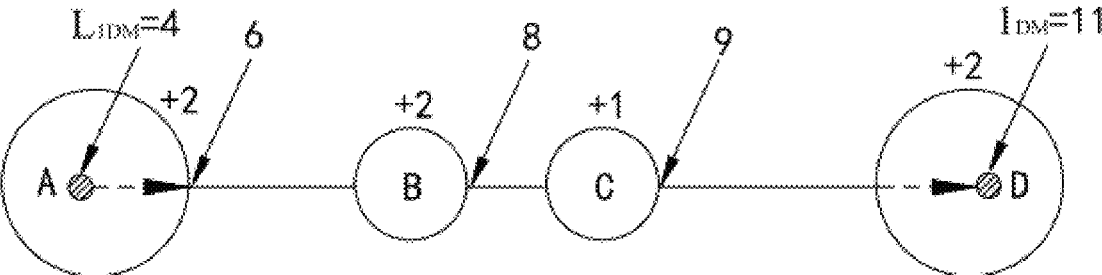

FIG. 14

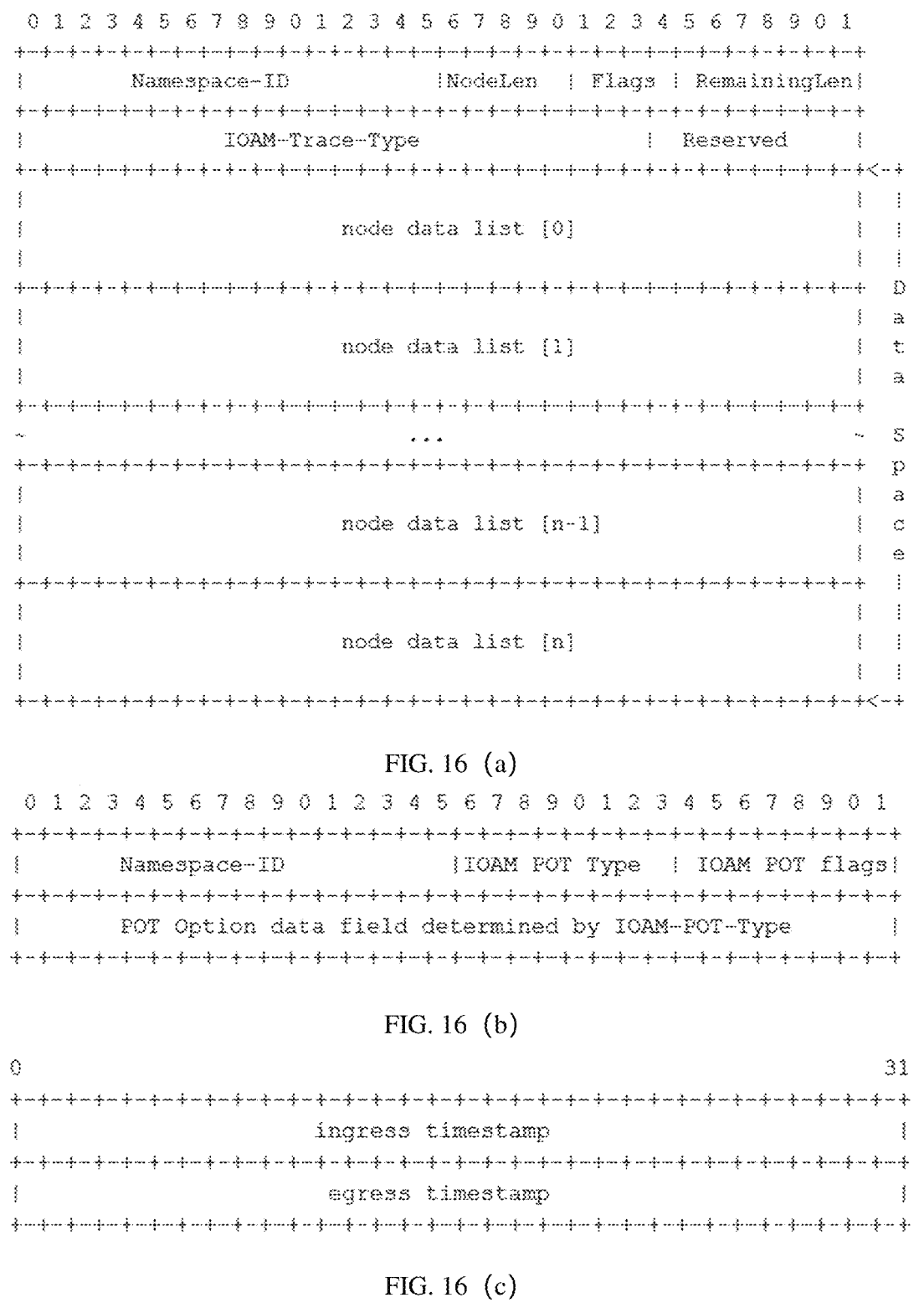

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Namespace-ID          |NodeLen | Flags | RemainingLen|
+-+-+-+-+-+-+-+-+-+-+-+-+-+-+-+-+-+-+-+-+-+-+-+-+-+-+-+-+-+-+-+-+
|           IOAM-Trace-Type                 |     Reserved      |
+-+-+-+-+-+-+-+-+-+-+-+-+-+-+-+-+-+-+-+-+-+-+-+-+-+-+-+-+-+-+-+-+<-+
|                                                             |  |
|                   node data list [0]                        |  |
|                                                             |  |
+-+-+-+-+-+-+-+-+-+-+-+-+-+-+-+-+-+-+-+-+-+-+-+-+-+-+-+-+-+-+-+-+ D
|                                                             |  a
|                   node data list [1]                        |  t
|                                                             |  a
+-+-+-+-+-+-+-+-+-+-+-+-+-+-+-+-+-+-+-+-+-+-+-+-+-+-+-+-+-+-+-+-+
~                            ...                              ~  S
+-+-+-+-+-+-+-+-+-+-+-+-+-+-+-+-+-+-+-+-+-+-+-+-+-+-+-+-+-+-+-+-+  p
|                                                             |  a
|                   node data list [n-1]                      |  c
|                                                             |  e
+-+-+-+-+-+-+-+-+-+-+-+-+-+-+-+-+-+-+-+-+-+-+-+-+-+-+-+-+-+-+-+-+  |
|                                                             |  |
|                   node data list [n]                        |  |
|                                                             |  |
+-+-+-+-+-+-+-+-+-+-+-+-+-+-+-+-+-+-+-+-+-+-+-+-+-+-+-+-+-+-+-+-+<-+
```

FIG. 16 (a)

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|         Namespace-ID          | IOAM POT Type | IOAM POT flags|
+-+-+-+-+-+-+-+-+-+-+-+-+-+-+-+-+-+-+-+-+-+-+-+-+-+-+-+-+-+-+-+-+
|       POT Option data field determined by IOAM-POT-Type       |
+-+-+-+-+-+-+-+-+-+-+-+-+-+-+-+-+-+-+-+-+-+-+-+-+-+-+-+-+-+-+-+-+
```

FIG. 16 (b)

```
0                                                              31
+-+-+-+-+-+-+-+-+-+-+-+-+-+-+-+-+-+-+-+-+-+-+-+-+-+-+-+-+-+-+-+-+
|                      ingress timestamp                        |
+-+-+-+-+-+-+-+-+-+-+-+-+-+-+-+-+-+-+-+-+-+-+-+-+-+-+-+-+-+-+-+-+
|                      egress timestamp                         |
+-+-+-+-+-+-+-+-+-+-+-+-+-+-+-+-+-+-+-+-+-+-+-+-+-+-+-+-+-+-+-+-+
```

FIG. 16 (c)

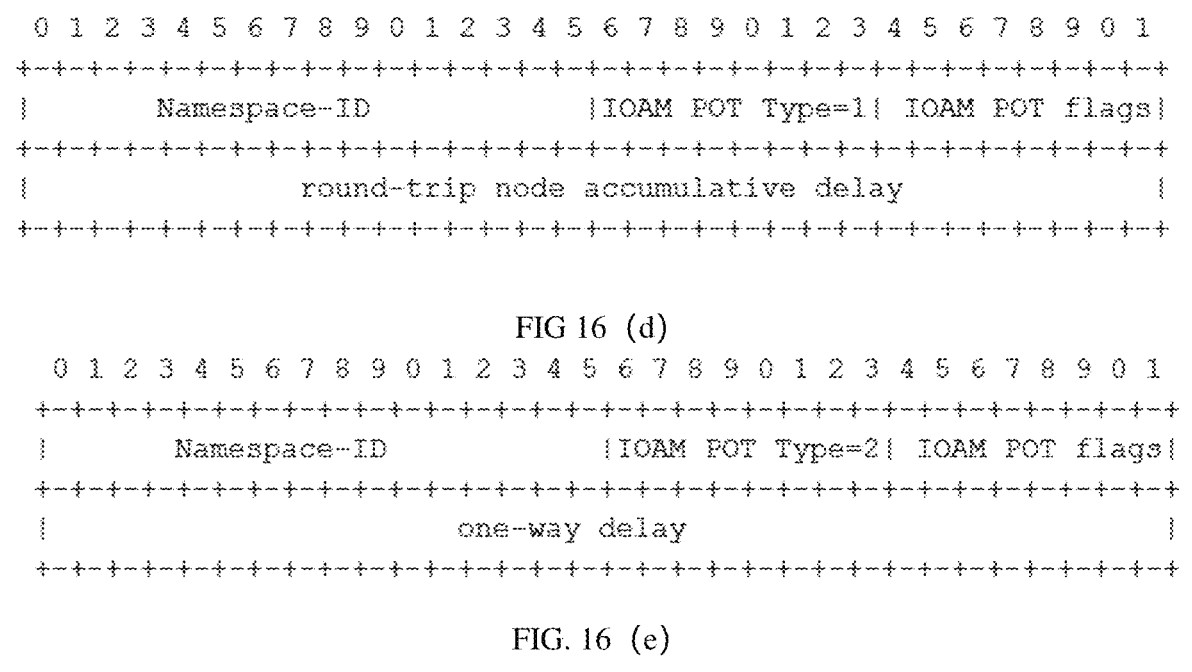

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Namespace-ID          |IOAM POT Type=1| IOAM POT flags|
+-+-+-+-+-+-+-+-+-+-+-+-+-+-+-+-+-+-+-+-+-+-+-+-+-+-+-+-+-+-+-+-+
|               round-trip node accumulative delay              |
+-+-+-+-+-+-+-+-+-+-+-+-+-+-+-+-+-+-+-+-+-+-+-+-+-+-+-+-+-+-+-+-+
```

FIG 16 (d)

```
 0 1 2 3 4 5 6 7 8 9 0 1 2 3 4 5 6 7 8 9 0 1 2 3 4 5 6 7 8 9 0 1
+-+-+-+-+-+-+-+-+-+-+-+-+-+-+-+-+-+-+-+-+-+-+-+-+-+-+-+-+-+-+-+-+
|          Namespace-ID          |IOAM POT Type=2| IOAM POT flags|
+-+-+-+-+-+-+-+-+-+-+-+-+-+-+-+-+-+-+-+-+-+-+-+-+-+-+-+-+-+-+-+-+
|                         one-way delay                         |
+-+-+-+-+-+-+-+-+-+-+-+-+-+-+-+-+-+-+-+-+-+-+-+-+-+-+-+-+-+-+-+-+
```

FIG. 16 (e)

DELAY MEASUREMENT METHOD AND APPARATUS, STORAGE MEDIUM AND PROGRAM PRODUCT

CROSS-REFERENCE TO RELATED APPLICATIONS

This application is a national stage filing under 35 U.S.C. § 371 of international application number PCT/CN2023/073243, filed Jan. 19, 2023, which claims priority to Chinese patent application No. 202210621929.0 filed on Jun. 2, 2022. The contents of these applications are incorporated herein by reference in their entirety.

TECHNICAL FIELD

The present disclosure relates to the technical field of communications, in particular to a delay measurement method and apparatus, a computer-readable storage medium and a computer program product.

BACKGROUND

In order to provide better services to customers and facilitate network operation and maintenance, telecommunication operators need to monitor end-to-end performance indicators of networks and services, such as delay, jitter, packet loss rate and throughput. Delay measurement can be divided into one-way delay measurement and round-trip delay measurement. Since many critical services are one-way services and the round-trip delay is asymmetric in forward and reverse directions, one-way delay measurement can more accurately reflect the network service status, such as whether congestion occurs. Therefore, it is particularly important to accurately measure the one-way delay of services. Currently, the implementation of various one-way delay measurement mechanisms relies on time synchronization. With time synchronization, only sequence numbers or coloring techniques are needed to mark specific packets and perform related calculations to obtain one-way delay. However, the requirement for time synchronization cannot be met in many scenarios, such as deploying servers in machine rooms, basements, or caves, where GPS timing mechanisms are not suitable. The 1588 clock protocol also has limitations in terms of adaptability and is not suitable for large-scale network-wide deployment, making it impossible to ensure one-way delay measurement.

SUMMARY

Embodiments of the present disclosure provide a delay measurement method and apparatus, a computer-readable storage medium, and a computer program product, which can realize reliable measurement of one-way delay without time synchronization.

In accordance with a first aspect of the present disclosure, an embodiment provides a delay measurement method, the delay measurement method may include:

acquiring target time information carried by a first delay measurement packet, the target time information including first time information filled by an intermediate node on a transmission path and second time information filled by a destination node on the transmission path, where the first time information is used to acquire a residence time of the first delay measurement packet at the intermediate node, and the second time information is used to acquire a residence time of the first delay measurement packet at the destination node;

acquiring an accumulative one-way link delay from a source node to the destination node according to the first time information and the second time information; and transmitting a second delay measurement packet including the accumulative one-way link delay to the destination node, so that the destination node acquires a one-way delay from the source node to the destination node according to the accumulative one-way link delay.

In accordance with a second aspect of the present disclosure, an embodiment further provides a delay measurement apparatus, which may include: a memory, a processor, and a computer program stored in the memory and executable by the processor, where the computer program, when executed by the processor, causes the processor to perform the delay measurement method described above.

In accordance with a third aspect of the present disclosure, an embodiment further provides a computer-readable storage medium storing computer-executable instructions for performing the delay measurement method described above.

In accordance with a fourth aspect of the present disclosure, an embodiment further provides a computer program product, which may include a computer program or computer instructions stored in a computer-readable storage medium, from which a processor of a computer device reads the computer program or the computer instructions, where the computer program or the computer instructions, when executed by the processor, cause the computer device to perform the delay method described above.

In the embodiments of the present disclosure, by acquiring the first time information filled by the intermediate node and the second time information filled by the destination node carried by the first delay measurement packet transmitted between the source node and the destination node, that is, under the condition of determining the residence time of the first delay measurement packet in the intermediate node and the destination node, the accumulative one-way link delay from the source node to the destination node can be acquired based on the first time information and the second time information, and then the one-way delay from the source node to the destination node is determined by transmitting the second delay measurement packet including the acquired accumulative one-way link delay from the source node to the destination node. Since the acquisition of accumulative one-way link delay or one-way delay involved in the measurement process is all carried out within the relevant nodes, that is, there is no need to achieve time synchronization between the nodes, but the relevant nodes can accurately and reliably obtain the final one-way delay according to the actual delay scenario. Therefore, the embodiments of the present disclosure can achieve reliable measurement of one-way delay without time synchronization, improve the measurement accuracy of one-way delay, and thus make up for the technical gaps in the relevant methods.

BRIEF DESCRIPTION OF DRAWINGS

FIG. 1 is a flowchart of a delay measurement method according to an embodiment of the present disclosure;

FIG. 2 is a flowchart of acquiring target time information in a delay measurement method according to an embodiment of the present disclosure;

FIG. 3 is a flowchart of acquiring target time information in a delay measurement method according to another embodiment of the present disclosure;

FIG. 4 is a flowchart of acquiring an accumulative one-way link delay from a source node to a destination node in a delay measurement method according to an embodiment of the present disclosure;

FIG. 5 is a schematic diagram of a delay measurement method according to an embodiment of the present disclosure;

FIG. 6 is a schematic diagram of a delay measurement method according to another embodiment of the present disclosure;

FIG. 7 is a schematic diagram of a delay measurement method according to another embodiment of the present disclosure;

FIG. 8 is a schematic diagram of an application scenario of a delay measurement method according to an embodiment of the present disclosure;

FIG. 9 is a flowchart of acquiring an accumulative one-way link delay from a source node to a destination node in a delay measurement method according to another embodiment of the present disclosure;

FIG. 10 is a schematic diagram of an application scenario of a delay measurement method according to an embodiment of the present disclosure;

FIG. 11 is a flowchart of transmitting a second delay measurement packet including an accumulative one-way link delay to a destination node in a delay measurement method according to an embodiment of the present disclosure;

FIG. 12 is a flowchart of transmitting a second delay measurement packet including an accumulative one-way link delay to a destination node in a delay measurement method according to another embodiment of the present disclosure;

FIG. 13 is a schematic diagram of a delay measurement method according to another embodiment of the present disclosure;

FIG. 14 is a schematic diagram of a delay measurement method according to another embodiment of the present disclosure;

FIG. 16 is a schematic diagram of encapsulation of fields required by a delay measurement method according to an embodiment of the present disclosure in an OAM protocol measurement packet.

DETAILED DESCRIPTION

Figure 15:
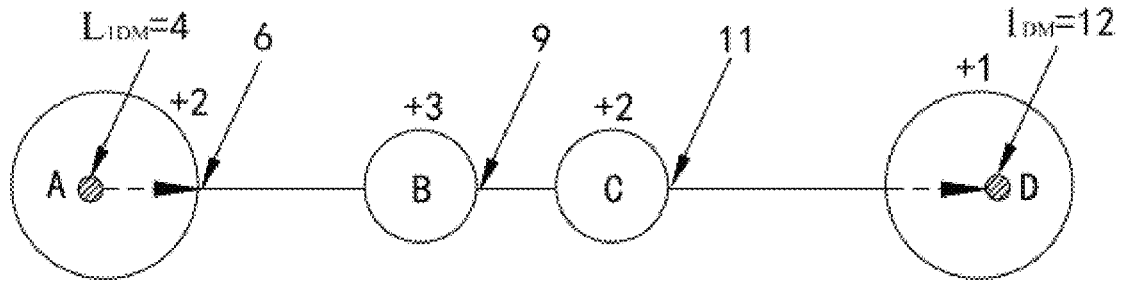
FIG. 15 is a schematic diagram of a delay measurement method according to another embodiment of the present disclosure.

In order to make the objectives, technical schemes and advantages of the present disclosure more apparent, the present disclosure is further described in detail with reference to the accompanying drawings and embodiments. It should be understood that the particular embodiments described herein are only intended to explain the present disclosure, and are not intended to limit the present disclosure.

It is to be noted that although a logical order is shown in the flowcharts, the steps shown or described may be performed, in some cases, in a different order from the order shown or described in the flowcharts. The terms such as "first" and "second" in the description, claims and above-mentioned drawings are intended to distinguish between similar objects and are not necessarily to describe a specific order or sequence.

At present, because the one-way delay measurement mechanism based on time synchronization cannot be applied in many scenarios, research is being carried out around the one-way delay measurement technology without time synchronization. For example, one such approach is: assuming that the delay on the transmission path is equal in both the forward and reverse directions, and then dividing the round-trip delay by two to acquire the one-way delay. However, this assumption only holds true in a few environments with controllable network traffic (such as industrial local area networks, etc.) and is not applicable to all network scenarios. Another approach is: analyzing the one-way transmission delay of a reference packet and correlating its theoretical value with the actual value. The disadvantage of this approach is that in most scheduling mechanisms and service scenarios, due to the jitter of the reference packet and other reasons, it may not be able to accurately determine the theoretical value of the reference packet. There is still another approach: assuming that the delays other than the queuing delay are constant values, and estimating the queuing delay by applying differential fitting algorithms. However, this approach often suffers from the problem of large estimation errors.

Based on this, the present disclosure provides a delay measurement method and apparatus, a computer-readable storage medium, and a computer program product. A delay measurement method according to an embodiment includes: acquiring target time information carried by a first delay measurement packet, the target time information including first time information filled by an intermediate node on a transmission path and second time information filled by a destination node on the transmission path, where the first time information is used to acquire a residence time of the first delay measurement packet at the intermediate node, and the second time information is used to acquire a residence time of the first delay measurement packet at the destination node; acquiring an accumulative one-way link delay from a source node to the destination node according to the first time information and the second time information; and transmitting a second delay measurement packet including the accumulative one-way link delay to the destination node, so that the destination node acquires a one-way delay from the source node to the destination node according to the accumulative one-way link delay. In this embodiment, by acquiring the first time information filled by the intermediate node and the second time information filled by the destination node carried by the first delay measurement packet transmitted between the source node and the destination node, that is, under the condition of determining the residence time of the first delay measurement packet in the intermediate node and the destination node, the accumulative one-way link delay from the source node to the destination node can be acquired based on the first time information and the second time information, and then the one-way delay from the source node to the destination node is determined by transmitting the second delay measurement packet including the acquired accumulative one-way link delay from the source node to the destination node. Since the acquisition of accumulative one-way link delay or one-way delay involved in the measurement process is all carried out within the relevant nodes, that is, there is no need to achieve time synchronization between the nodes, but the relevant nodes can accurately and reliably obtain the final one-way delay according to the actual delay scenario. Therefore, the embodiment of the present disclosure can achieve reliable measurement of one-way delay without time synchronization, improve the measurement accuracy of one-way delay, and thus make up for the technical gaps in the relevant methods.

The embodiments of the present disclosure will be further explained below with reference to the accompanying drawings.

As shown in FIG. 1, a flowchart of a delay measurement method according to an embodiment of the present disclosure is depicted. The delay measurement method includes but is not limited to steps S110 to S130.

At S110, target time information carried by a first delay measurement packet is acquired, the target time information including first time information filled by an intermediate node on a transmission path and second time information filled by a destination node on the transmission path, where the first time information is used to acquire a residence time of the first delay measurement packet at the intermediate node, and the second time information is used to acquire a residence time of the first delay measurement packet at the destination node.

In this step, by acquiring the first time information filled by the intermediate node and the second time information filled by the destination node carried by the first delay measurement packet transmitted between the source node and the destination node, that is, in the case of determining the corresponding residence time of the first delay measurement packet with respect to the intermediate node and the destination node, the accumulative one-way link delay from the source node to the destination node can be acquired based on the first time information and the second time information in the subsequent step.

In an embodiment, the distinction between the source node, the intermediate node and the destination node is presented only according to their specific functions in the transmission path, that is, the source node is a source node on the transmission path, the intermediate node is an intermediate node on the transmission path and has a function of filling the first time information, and the destination node is a destination node on the transmission path and has a function of filling the second time information. Specific parameters, contents, application ways, etc. of the source node, the intermediate node and the destination node can be set accordingly according to specific scenarios, and are not limited here.

In an embodiment, the specific types of the source node, the intermediate node, and the destination node may be varied, and are not limited herein. For example, any one of the source node, the intermediate node and the destination node may be, but is not limited to, a transmitting terminal, an access terminal, a modulator, a serving unit, or the like. In case that it is a transmitting terminal or an access terminal, it may be, but is not limited to, user equipment (UE), a subscriber unit, a subscriber station, a mobile station, a mobile console, a remote station, a remote terminal, a mobile device, a user terminal, a wireless communication device, a user agent, a user apparatus, etc.

In an embodiment, in a specific application scenario, the number of intermediate nodes may be, but is not limited to, one or more. The intermediate nodes may all be used to fill the first time information regardless of the number of intermediate nodes. That is, the first time information included in the target time information may be one or more pieces, which is not limited here, and this does not affect the calculation of the accumulative one-way link delay.

In an embodiment, the type, content, etc. of the first delay measurement packet may be set accordingly according to a specific scenario, and the transmission path may be, but is not limited to, a target path adopted in the corresponding scenario, or another transmission path sharing similar or near-equivalent characteristics with the target path, etc., which is not limited herein.

As shown in FIG. 2, in an embodiment of the present disclosure, step S110 is further described. Step S110 includes but is not limited to steps S111 and S113.

At S111, the first delay measurement packet including a loopback flag is transmitted to the destination node.

At S112, the first delay measurement packet returned by the destination node according to the loopback flag is received, where, when the first delay measurement packet resides in the intermediate node and the destination node on the transmission path, the intermediate node fills the first time information into the first delay measurement packet and the destination node fills the second time information into the first delay measurement packet.

At S113, the target time information including the first time information and the second time information is acquired from the first delay measurement packet.

In this step, since the first delay measurement packet carries the loopback flag, when the destination node receives the transmitted first delay measurement packet, the first delay measurement packet can be returned to the source node according to the loopback flag. When the first delay measurement packet resides in the intermediate node and the destination node on the transmission path, the intermediate node fills the first time information into the first delay measurement packet and the destination node fills the second time information into the first delay measurement packet, so that the first delay measurement packet returned to the source node stores the first time information and the second time information. Therefore, the target time information including the first time information and the second time information can be acquired from the first delay measurement packet returned.

In an embodiment, there are various specific ways of transmitting the first delay measurement packet including the loopback flag to the destination node and receiving the first delay measurement packet returned by the destination node according to the loopback flag, which are not limited herein. For example, it may be, but is not limited to: transmitting a first delay measurement packet including a loopback flag to a destination node along the transmission path, and receiving a first delay measurement packet returned by the destination node along the transmission path according to the loopback flag. The intermediate node and the destination node are arranged on the transmission path, that is, by transmitting the first delay measurement packet on the transmission path and receiving the first delay measurement packet returned along the transmission path at the same time, the overall measurement of the first delay measurement packet is realized, and the target time information including the first time information and the second time information can be reliably acquired with the first delay measurement packet cooperating with the transmission path. In an embodiment, the loopback flag can ensure that the destination node clearly and reliably returns the first delay measurement packet along the original transmission path, so that the relevant information for calculating the accumulative one-way link delay can be acquired from the returned first delay measurement packet, which is beneficial to improving the stability of delay measurement. It can be understood that the loopback flag is a communication medium well known to those of ordinary skill in the art and will not be detailed herein.

In an embodiment of the present disclosure, step S111 is further described. Step S111 includes but is not limited to step S1111.

At S1111, the first delay measurement packet including a loopback flag is transmitted to the destination node once along the transmission path.

In this step, considering that the transmission path and the service condition does not change, the accumulative one-way link delays corresponding to the multiple transmissions of the first delay measurement packet are the same, that is, the measurement effect of each transmission of the first delay measurement packet is substantially the same. Therefore, in order to reduce the measurement workload, it is only necessary to transmit the first delay measurement packet including the loopback flag once, so that the delay measurement efficiency can be improved. However, in order to improve the accuracy of delay measurement, it is also possible to send the first delay measurement packet including the loopback flag for several times, which is not limited in this embodiment.

As shown in FIG. 3, in an embodiment of the present disclosure, step S113 is further described in a case where the target time information further includes a first transmit timestamp and a first reception timestamp filled by the source node, and step S113 includes but is not limited to step S1131.

At S1131, the target time information including the first time information, the second time information, the first transmit timestamp, and the first reception timestamp is acquired from the first delay measurement packet.

In this step, since the first transmit timestamp and the first reception timestamp filled by the source node can respectively represent the time when the source node transmits the first delay measurement packet and the time when the source node receives the first delay measurement packet, that is, the overall time for achieving the round-trip of the measurement packet on the transmission path can be presented, it can be considered as the target time information and, combined with the delay information of the subsequent nodes such as the first time information and the second time information, can be used for calculating the accumulative one-way link delay from the source node to the destination node, which is beneficial to improving the accuracy of the delay measurement.

In an embodiment, the timing of filling the first transmit timestamp and the first reception timestamp corresponds to the transmission situation of the first delay measurement packet on the transmission path. For example, the first transmit timestamp is filled when it is detected that the first delay measurement packet is transmitted to the egress of the source node, and the first reception timestamp is filled when it is detected that the first delay measurement packet is transmitted to the ingress of the source node.

At S120, an accumulative one-way link delay from a source node to the destination node is acquired according to the first time information and the second time information.

In this step, since the first time information filled by the intermediate node on the transmission path and the second time information filled by the destination node have been determined in step S110, that is, the residence time corresponding to the intermediate node on the transmission path and the destination node has been determined, the accumulative one-way link delay from the source node to the destination node can be acquired according to the first time information and the second time information, so that the one-way delay from the source node to the destination node can be calculated in the subsequent step through the destination node according to the accumulative one-way link delay.

In an embodiment of the present disclosure, step S120 is further described. Step S120 includes but is not limited to step S121.

At S121, the first time information and the second time information are transmitted to a network controller, so that the network controller acquires the accumulative one-way link delay from the source node to the destination node according to the first time information and the second time information.

In this step, since the network controller can carry out real-time management and control based on the background, that is, the network controller has high intelligence and sufficient and comprehensive backend operation functions, including computation and coordination, etc., the first time information and the second time information are transmitted to the network controller, so that the network controller can accurately and reliably acquire the accumulative one-way link delay from the source node to the destination node according to the first time information and the second time information, which can avoid the trouble of calculating the accumulative one-way link delay by other means, and is beneficial to acquiring more accurate delay measurement results.

In an embodiment, there are various types of network controllers, which are not limited herein. For example, the network controller may be, but is not limited to, a network interface card, which is computer hardware used to allow computers to communicate over a computer network, and has a MAC address so that users can connect to each other via cable or wirelessly. The network interface card can be equipped with a processor and a memory (including RAM and ROM). The communication between the network interface card and the local area network can be carried out in serial transmission mode through cable or twisted pair, and the communication between the network interface card and the computer can be carried out in parallel transmission mode through I/O bus on the computer motherboard. That is to say, the network interface card can perform serial/parallel conversion, and the data rate on the network may be different from that on the computer bus. Therefore, the data rate can be stored for query in the network interface card based on the memory chip that caches the data.

In an embodiment of the present disclosure, step S120 is further described. Step S120 includes but is not limited to step S122.

At S122, the accumulative one-way link delay from the source node to the destination node is acquired according to the first time information, the second time information, the first transmit timestamp, and the first reception timestamp.

In this step, the first transmit timestamp and the first reception timestamp filled by the source node can respectively represent the time when the source node transmits the first delay measurement packet and the time when the source node receives the first delay measurement packet, that is, the overall time for achieving the round-trip of the measurement packet on the transmission path can be presented. Therefore, when the first transmit timestamp and the first reception timestamp are considered as the target time information, the accumulative one-way link delay from the source node to the destination node can be acquired in combination with the delay information, such as the first time information and the second time information, which is beneficial to improving the accuracy of the delay measurement.

As shown in FIG. 4, in an embodiment of the present disclosure, step S122 is further described in a case where the first time information includes a first ingress timestamp and a first egress timestamp, and the second time information includes a second ingress timestamp and a second egress timestamp, and step S122 includes but is not limited to step S1221.

At S1221, the accumulative one-way link delay from the source node to the destination node is acquired according to a difference between the first egress timestamp and the first ingress timestamp, a difference between the second egress timestamp and the second ingress timestamp, and a difference between the first reception timestamp and the first transmit timestamp.

In this step, since the difference between the first reception timestamp and the first transmit timestamp represents the overall round-trip time of the measurement packet on the transmission path, the difference between the first egress timestamp and the first ingress timestamp represents the residence time of the first delay measurement packet at the intermediate node on the transmission path, and the difference between the second egress timestamp and the second ingress timestamp represents the residence time of the first delay measurement packet at the destination node on the transmission path, it can be inferred that the accumulative one-way link delay from the source node to the destination node along the transmission path can be derived by subtracting the relevant residence time from the overall round-trip time. This allows for the accurate acquisition of the accumulative one-way link delay from the source node to the destination node.

In an embodiment, the accumulative one-way link delay from the source node to the destination node may be acquired based on, but not limited to, the following method, that is, the accumulative one-way link delay is equal to the difference between the first reception timestamp and the first transmit timestamp minus the difference between the first egress timestamp and the first ingress timestamp, further minus the difference between the second egress timestamp and the second ingress timestamp, and finally divided by two.

In an embodiment, the timing of filling the first egress timestamp and the first ingress timestamp and the timing of filling the second egress timestamp and the second ingress timestamp correspond to the transmission of the first delay measurement packet on the transmission path. For example, the first ingress timestamp is filled when it is detected that the first delay measurement packet is transmitted to the ingress of the intermediate node, and the first egress timestamp is filled when it is detected that the first delay measurement packet is transmitted to the egress of the intermediate node. The same also applies when the first delay measurement packet is returned on the transmission path. The second ingress timestamp is filled when it is detected that the first delay measurement packet is transmitted to the ingress of the destination node, and the second egress timestamp is filled when it is detected that the first delay measurement packet is transmitted to the egress of the destination node. The same also applies when the first delay measurement packet is returned on the transmission path.

Specific examples are given below to illustrate a working principle and procedure of each of the above-described embodiments.

Example I

As shown in FIG. 5, which is a schematic diagram of a delay measurement method according to an embodiment of the present disclosure.

Referring to FIG. 5, the source node A transmits a first delay measurement packet with loopback or round-trip flag to the destination node C. The first delay measurement packet is transmitted back to the source node A according to the reverse path at the destination node C. When the first delay measurement packet is transmitted from or received at the port, a timestamp is added to the first delay measurement packet, i.e. in the process of the first delay measurement packet being transmitted from the source node A to the destination node C, a timestamp t1 is added at the egress of the source node A, an ingress timestamp t2 and an egress timestamp t3 are added at the intermediate node B, and an ingress timestamp t4 is added at the destination node C. Similarly, in the process of the first delay measurement packet being transmitted back to the source node A, timestamps t5, t6, t7, and t8 are added in the same manner at the corresponding nodes C, B, and A, respectively, where the processing delay of the intermediate node in two directions of the round-trip is allowed to be inconsistent, for example, $t7-t6/t3-t2$ may be established at the intermediate node B.

Under the assumption that the delay of the link portion in the transmission path has symmetry, the accumulative one-way link delay $L_{1DM}$ can be calculated by the following formula:

$$L_{1DM} = ((t8 - t1) - (t3 - t2) - (t5 - t4) - (t7 - t6))/2.$$

As can be seen from the above example, since the subtraction operation involving all timestamps is performed in the relevant nodes, it is not necessary to realize time synchronization between the nodes, that is, reliable measurement of the accumulative one-way link delay can be realized without time synchronization, and the measurement accuracy of the accumulative one-way link delay can be improved, thereby making up for the technical gap in the relevant methods.

Example II

As shown in FIG. 6, which is a schematic diagram of a delay measurement method according to another embodiment of the present disclosure.

Referring to FIG. 6, node A is a source node, node B is an intermediate node 1, node C is an intermediate node 2, and node D is a destination node. If the delay of the first delay measurement packet is consistent in both the forward and reverse directions in each node, then:

Node A->Node D direction: the egress timestamp of node A is 0, the ingress timestamp and egress timestamp of node B are 2 and 3, respectively, the ingress timestamp and egress timestamp of node C are 4 and 6, respectively, and the ingress timestamp of node D is 7;

Node D->Node A direction: the egress timestamp of node D is 9, the ingress timestamp and egress timestamp of node C are 10 and 12, the ingress timestamp and egress timestamp of node B are 13 and 14, and the ingress timestamp of node A is 16.

Then, the accumulative one-way link delay $L_{1DM}$ calculated at node A according to the first delay measurement packet is as follows:

$$L_{1DM} = (16 - 0 - (3 - 2) - (6 - 4) - (9 - 7) - (12 - 10) - (14 - 13))/2 = 4.$$

Example III

As shown in FIG. 7, which is a schematic diagram of a delay measurement method according to another embodiment of the present disclosure.

Referring to FIG. 7, node A is a source node, node B is an intermediate node 1, node C is an intermediate node 2, and node D is a destination node. If the delay of the first delay measurement packet is consistent in both the forward and reverse directions in each node, then:

Node A->Node D direction: the egress timestamp of node A is 0, the ingress timestamp and egress timestamp of node B are 2 and 3, respectively, the ingress timestamp and egress timestamp of node C are 4 and 6, respectively, and the ingress timestamp of node D is 7;

Node D->Node A direction: the egress timestamp of node D is 9, the ingress timestamp and egress timestamp of node C are 11 and 14, the ingress timestamp and egress timestamp of node B are 13 and 15, and the ingress timestamp of node A is 18.

Then, the accumulative one-way link delay $L_{1DM}$ calculated at node A according to the first delay measurement packet is as follows:

$$L_{1DM} = (18 - 0 - (3 - 2) - (6 - 4) - (9 - 7) - (14 - 11) - (15 - 13))/2 = 4.$$

As can be seen from this example in combination with Example II, regardless of whether the delay of the first delay measurement packet in the node is consistent or not in the forward and reverse directions, the accumulative one-way link delay can be correctly calculated, and the accumulative one-way link delay acquired each time will be completely equal. Therefore, compared with the related art, the embodiment of the present disclosure does not need to require the same delay in both the forward and reverse directions on the transmission path, that is, the embodiment of the present disclosure can still be applied even if the delays in the forward and reverse directions in the transmission path are not equal, which greatly expands the applicable network scenario.

As shown in FIG. 8, in an embodiment of the present disclosure, step S120 is further described in a case where the source node stores a second transmit timestamp when transmitting the first delay measurement packet and a second reception timestamp when receiving the first delay measurement packet, and step S120 includes but is not limited to steps S123 to S124.

At S123, a second transmit timestamp and a second reception timestamp are acquired.

At S124, the accumulative one-way link delay from the source node to the destination node is acquired according to the second transmit timestamp, the second reception timestamp, the first time information, and the second time information.

In this step, since the source node stores a second transmit timestamp when transmitting the first delay measurement packet and a second reception timestamp when receiving the first delay measurement packet, that is, the overall time for achieving the round-trip of the measurement packet on the transmission path can be presented, it can be considered as the target time information and, combined with the delay information of the subsequent nodes such as the first time information and the second time information, can be used for acquiring the accumulative one-way link delay from the source node to the destination node, which is beneficial to improving the accuracy of the delay measurement.

In an embodiment, the timing of filling the second transmit timestamp and the second reception timestamp corresponds to the transmission situation of the first delay measurement packet on the transmission path. For example, the second transmit timestamp is filled when it is detected that the first delay measurement packet is transmitted to the egress of the source node, and the second reception timestamp is filled when it is detected that the first delay measurement packet is transmitted to the ingress of the source node.

As shown in FIG. 9, in an embodiment of the present disclosure, step S124 is further described in a case where the first time information includes a third ingress timestamp and a third egress timestamp, and the second time information includes a fourth ingress timestamp and a fourth egress timestamp, and step S124 includes but is not limited to step S1241.

At S1241, the accumulative one-way link delay from the source node to the destination node is acquired according to a difference between the second reception timestamp and the second transmit timestamp, a difference between the third egress timestamp and the third ingress timestamp, and a difference between the fourth egress timestamp and the fourth ingress timestamp.

In this step, since the difference between the second reception timestamp and the second transmit timestamp represents the overall round-trip time of the measurement packet on the transmission path, the difference between the third egress timestamp and the third ingress timestamp represents the residence time of the first delay measurement packet at the intermediate node on the transmission path, and the difference between the fourth egress timestamp and the fourth ingress timestamp represents the residence time of the first delay measurement packet at the destination node on the transmission path, it can be inferred that the accumulative one-way link delay from the source node to the destination node along the transmission path can be derived by subtracting the relevant residence time from the overall round-trip time. This allows for the accurate acquisition of the accumulative one-way link delay from the source node to the destination node.

In an embodiment, the timing of filling the third egress timestamp and the third ingress timestamp and the timing of filling the fourth egress timestamp and the fourth ingress timestamp correspond to the transmission of the first delay measurement packet on the transmission path. For example, the third ingress timestamp is filled when it is detected that the first delay measurement packet is transmitted to the ingress of the intermediate node, the third egress timestamp is filled when it is detected that the first delay measurement packet is transmitted to the egress of the intermediate node. The same also applies when the first delay measurement packet is returned on the transmission path. The fourth ingress timestamp is filled when it is detected that the first delay measurement packet is transmitted to the ingress of the destination nod, the fourth egress timestamp is filled when it is detected that the first delay measurement packet is transmitted to the egress of the destination node. The same also applies when the first delay measurement packet is returned on the transmission path.

A specific example is given below to illustrate a working principle and procedure of each of the above-described embodiments.

Example IV

As shown in FIG. 10, which is a schematic diagram of a delay measurement method according to another embodiment of the present disclosure.

Similar to the implementation principle of Example I, in order to prevent the payload of the transmitted packet from being reduced so as to facilitate application to a large-scale network, in this example, only the accumulative round-trip delay at the intermediate node is recorded in the first delay measurement packet, and the transmit time and the reception time of the first delay measurement packet at the source node are maintained locally in the source node.

Referring to FIG. 10, assuming that the transmit time and the reception time of the first delay measurement packet at node A are t1 and t2, respectively, the delays in the forward and reverse directions of node B are T1 and T2, respectively, and the delay of node C is T3, then the accumulative delay of the nodes is T=T1+T2+T3, and it can be seen that the accumulative one-way link delay $L_{1DM}$ can be calculated by the following formula:

$$L_{1DM} = (t2 - t1 - T)/2.$$

It can be understood that since the value of the accumulative one-way link delay measured by transmitting a plurality of round-trip measurement packets is equal, the above measurement process only needs to be performed once for each service path, which can significantly improve the measurement efficiency.

At S130, a second delay measurement packet including the accumulative one-way link delay is transmitted to the destination node, so that the destination node acquires a one-way delay from the source node to the destination node according to the accumulative one-way link delay.

In this step, by acquiring the first time information filled by the intermediate node and the second time information filled by the destination node carried by the first delay measurement packet transmitted between the source node and the destination node, that is, under the condition of determining the residence time of the first delay measurement packet in the intermediate node and the destination node, the accumulative one-way link delay from the source node to the destination node can be acquired based on the first time information and the second time information, and then the one-way delay from the source node to the destination node is determined by transmitting the second delay measurement packet including the acquired accumulative one-way link delay from the source node to the destination node. Since the acquisition of accumulative one-way link delay or one-way delay involved in the measurement process is all carried out within the relevant nodes, that is, there is no need to achieve time synchronization between the nodes, but the relevant nodes can accurately and reliably obtain the final one-way delay according to the actual delay scenario. Therefore, the embodiments of the present disclosure can achieve reliable measurement of one-way delay without time synchronization, improve the measurement accuracy of one-way delay, and thus make up for the technical gaps in the relevant methods.

As shown in FIG. 11, in an embodiment of the present disclosure, step S130 is further described. Step S130 includes but is not limited to step S131.

At S131, the second delay measurement packet including the accumulative one-way link delay is transmitted to the destination node, so that the destination node transmits the accumulative one-way link delay to a network controller to acquire the one-way delay from the source node to the destination node.

In this step, since the network controller can carry out real-time management and control based on the background, that is, the network controller has high intelligence and sufficient and comprehensive backend operation functions, including computation and coordination, etc., the accumulative one-way link delay is transmitted to the network controller, so that the network controller can accurately and reliably acquire the one-way delay from the source node to the destination node according to the accumulative one-way link delay, which can avoid the trouble of calculating the one-way delay by other means, and is beneficial to acquiring more accurate delay measurement results.

In an embodiment, there are various types of network controllers, which are not limited herein. Since it has already been described in the above-described embodiments, details will not be repeated here for avoidance of redundancy.

As shown in FIG. 12, in an embodiment of the present disclosure, step S130 is further described. Step S130 includes but is not limited to steps S132 and S134.

At S132, a second delay measurement packet including an accumulative delay field is generated.

At S133, the accumulative one-way link delay is filled into the accumulative delay field.

At S134, the second delay measurement packet including the accumulative delay field is transmitted to the destination node, so that the destination node acquires a one-way delay from the source node to the destination node according to information in the accumulative delay field, where, when the second delay measurement packet resides in a node on the transmission path, the node accumulates a residence time of the second delay measurement packet into the accumulative delay field.

In this step, through the accumulative delay field of the second delay measurement packet transmitted in a one-way manner, in the process of transmitting the second delay measurement packet to the destination node, the residence time of the second delay measurement packet in each node can be continuously accumulated and filled into the accumulative delay field, and finally the accumulative delay field filled with the total residence time of all nodes is obtained, and the accumulative delay field at this time can represent the overall delay situation of the transmission path, so that the destination node can accurately and reliably calculate the one-way delay from the source node to the destination node according to the information in the accumulative delay field.

In an embodiment, the second delay measurement packet including the accumulative delay field may be transmitted to the destination node in a variety of ways, which is not limited herein. For example, it may be, but is not limited to: a second delay measurement packet including an accumulative delay field is transmitted to a destination node along a transmission path, with an intermediate node and a destination node arranged on the transmission path, that is, by transmitting the second delay measurement packet on the transmission path, the destination node on the transmission path can better acquire information in the accumulative delay field and acquire a one-way delay from the source node to the destination node based on the information in the accumulative delay field.

In an embodiment, the accumulative delay field may be, but not limited to, pre-encapsulated in the second delay measurement packet, or may be included in the second delay measurement packet by other means. It will be more convenient to use the accumulative delay field for measurement and calculation, that is, only by accumulating and filling the residence time of the second delay measurement packet into the accumulative delay field, there is no need to re-acquire a new timestamp for calculation, so the delay measurement efficiency can be greatly improved.

A specific example is given below to illustrate a working principle and procedure of each of the above-described embodiments.

Example V

On the basis of Examples I to IV, the end-to-end one-way delay is measured by transmitting a one-way second delay measurement packet, and a field $1_{DM}$ is carried in the second delay measurement packet to record the accumulative one-way link delay, the initial value of the field is the measured accumulative one-way link delay $L_{1_{DM}}$, and as the second delay measurement packet passes through each node, the residence time at that node is accumulated and added into the field.

As shown in FIG. 13, which is a schematic diagram of a delay measurement method according to another embodiment of the present disclosure, where node A is a source node, node B is an intermediate node, and node C is a destination node.

Referring to FIG. 13, if the second delay measurement packet has a residence time of T1 in node A, a residence time of T2 in node B, and a residence time of T3 in node C, it can be seen that when node C receives the second delay measurement packet, the value of the $1_{DM}$ field is as follows:

$$1_{DM} = L_{1DM} + T1 + T2 + T3.$$

Thus, in this measurement process, the acquired one-way end-to-end delay, that is, the one-way delay from source node A to destination node C is $1_{DM}$.

The one-way delay measurement process can be carried out many times, and its measurement frequency can be determined according to actual needs. For example, the source node may, but is not limited to, transmit a plurality of one-way second delay measurement packets according to the planned measurement frequency, and the processing process of each second delay measurement packet is as shown in Example V. It can be clearly stated that due to jitter in the processing delay of the node, the measurement results of each one-way delay may not be exactly the same. This can reflect the real-time changes in node processing time, which is considered as an acceptable phenomenon.

Compared with the related art, in the embodiment of the present disclosure, it is not necessary to correlate the theoretical value of the one-way transmission delay of the reference packet with the actual value. Instead, the one-way transmission delay is directly measured. Therefore, even if the reference packet has jitter or the like, the normal execution of the embodiment of the present disclosure will not be affected, thereby having higher measurement stability. Furthermore, in the embodiment of the present disclosure, it is not necessary to assume that other delays other than the queuing delay are fixed values and further estimate the queuing delay by applying an algorithm such as differential fitting, which can greatly reduce the measurement error.

Example VI

As shown in FIG. 14, which is a schematic diagram of a delay measurement method according to another embodiment of the present disclosure.

Referring to FIG. 14, node A is a source node, node B is an intermediate node 1, node C is an intermediate node 2, and node D is a destination node.

If the measured one-way link delay is 4, the initial value of the one-way delay field $1_{DM}$ is set to 4, and the resident delay of each node for the second delay measurement packet is as follows: 2 in node A, 2 in node B, 1 in node C, and 2 in node D. Then in node D, the value of the one-way delay field $1_{DM}$ of the second delay measurement packet is:

$$1_{DM} = 4 + 2 + 2 + 1 + 2 = 11.$$

Example VII

As shown in FIG. 15, which is a schematic diagram of a delay measurement method according to another embodiment of the present disclosure.

Referring to FIG. 15, node A is a source node, node B is an intermediate node 1, node C is an intermediate node 2, and node D is a destination node.

If the measured one-way link delay is 4, the initial value of the one-way delay field $1_{DM}$ is set to 4, and the resident delay of each node for the second delay measurement packet is as follows: 2 in node A, 3 in node B, 2 in node C, and 1 in node D. Then in node D, the value of the one-way delay field $1_{DM}$ of the second delay measurement packet is:

$$1_{DM} = 4 + 2 + 3 + 2 + 1 = 12.$$

Combined with Example VI, it can be seen that the one-way delay acquired by each measurement is different, which can properly reflect the change of node processing delay.

In an embodiment, both the first delay measurement packet and the second delay measurement packet may be, but are not limited to, an Operation Administration and Maintenance (OAM) protocol measurement packet, the OAM protocol measurement packet including a measurement type flag field. When the measurement type flag field is set to a first preset value, the OAM protocol measurement packet is configured as the first delay measurement packet, and when the measurement type flag field is set to a second preset value, the OAM protocol measurement packet is configured as the second delay measurement packet. That is, the first delay measurement packet or the second delay measurement packet can be transmitted according to the measurement type flag field. Since the measurement functions of the first delay measurement packet and the second delay measurement packet are different, the specific packet to be transmitted can be selected according to the specific scenario in the practical application, which improves the convenience and reliability of the measurement operation and is conducive to optimizing the overall measurement process of the embodiment of the present disclosure.

In an embodiment, the OAM protocol measurement packet further includes an ingress timestamp field and an egress timestamp field, where the ingress timestamp field is used for filling in a timestamp when the OAM protocol measurement packet is received, and the egress timestamp field is used for filling in a timestamp when the OAM protocol measurement packet is transmitted. By setting the ingress timestamp field and the egress timestamp field, the timestamp when the OAM protocol measurement packet is received and the timestamp when the OAM protocol measurement packet is transmitted are filled respectively through the ingress timestamp field and the egress timestamp field, so as to ensure that the timestamp can be stably and reliably stamped in the corresponding scenario.

In an embodiment, the OAM protocol measurement packet further includes a residence time field, and the residence time field is used for filling in the residence time of the OAM protocol measurement packet in a node. By setting the residence time field, the residence time of the OAM protocol measurement packet in the node is filled in the residence time field, so as to ensure that the residence time can be accumulated stably and reliably when the packet passes through each node, and finally the accumulative delay field filled with the total residence time of all nodes is obtained. This further ensures that the destination node can accurately and reliably calculate the one-way delay from the source node to the destination node according to the information in the accumulative delay field.

In an embodiment, there is no restriction on the adopted OAM protocol carrier and the specific encapsulation format of the above fields in the OAM protocol measurement packet. For example, novel follow-flow detection technologies such as alternate marking and in-situ OAM can process packets in between, so such OAM protocols can be extended as carriers of measurement processes in the embodiments of the present disclosure. However, this does not exclude the possibility of using other OAM protocols as the carrier for the measurement packets employed in the embodiments of the present disclosure. As another example, for the alternate marking technique, it is possible but not limited to using 1 bit in the packet to mark the type of measurement packet. At each node, the processing delay in both the forward and reverse directions can be reported to the network controller. The network controller can then use the corresponding formulas from the previous examples to calculate the accumulative one-way link delay and one-way delay. Still as another example, the Trace Option-type header of in-situ OAM can be easily extended to mark the measurement packet type and record the egress and ingress timestamps of the packet at each node. That is to say, which OAM technology is adopted depends on the actual needs of those of ordinary skill in the art, and the specific utilization mode of the OAM protocol, the specific definition of protocol fields, and the like are not limited herein, and will not be described in further detail.

A specific example is given below to illustrate a working principle and procedure of each of the above-described embodiments.

Example VIII

As shown in FIG. 16, which is a schematic diagram of encapsulation of fields required by a delay measurement method according to an embodiment of the present disclosure in an OAM protocol measurement packet.

Taking the In-situ OAM protocol as an example, a loopback flag field has been defined in the existing encapsulation of In-situ OAM to indicate a packet loopback operation at the remote end. Therefore, when this field is set to 1, it can be indicated as a first delay measurement packet, and when this field is set to zero, it can be indicated as a second delay measurement packet.

Referring to FIG. 16(a), the In-situ OAM encapsulation draft has defined a Trace Option-type header to support recording information of each node in a specified format. In this example, this encapsulation header is used to record the egress and ingress timestamp information of each node.

Referring to FIG. 16(b), the In-situ OAM draft has defined Proof-of-Transit Option-type, and this header carries a field that can be modified at each intermediate node. This example uses this encapsulation header to carry a round-trip accumulative delay field and a one-way accumulative delay field.

Specifically, in the Trace Option-type encapsulation header, IOAM-Trace-Type is used to indicate the field position, field length and field format inserted into the measurement packet in each node; and IOAM-Trace-Type has a total of 24 bits, and each bit of 1 can indicate that a value is inserted into the node information, for example:

the $0^{th}$ bit represents the abbreviation of hop_limit and node id carried in the measurement packet;

the $1^{st}$ bit indicates that ingress_if_id and egress_if_id are carried in the measurement packet;

the $2^{nd}$ bit represents the part 'second' of the timestamp is carried in the measurement packet, and so on.

At present, bits 0-11 and 22 have been defined, bits 12-21 have not been defined, and bit 23 must be set to 0. Therefore, bits 12-21 can be defined to carry the required information. All information is an integer multiple of 4 bytes, for example:

the $12^{th}$ bit is defined to indicate that the node ingress timestamp is carried in the measurement packet, occupying 4 bytes; and the $13^{th}$ bit is defined to indicate that the node egress timestamp is carried in the measurement packet, occupying 4 bytes.

Assuming that bits 0-11, 14-22 of the IOAM-Trace-Type are all set to 0, and bits 12-13 are set to 1, the encapsulation format of the data of the IOAM packet at each node is shown in FIG. 16(c).

In the Proof-of-Transit Option-type encapsulation header, IOAM-PoT-Type is used to indicate the information content carried in the encapsulation header, including the order, length and meaning of fields. IOAM-PoT-Type has a total of 8 bits. Currently, IOAM-PoT-Type=0 has been defined, and the remaining values are not defined. This example can define the following content.

As shown in FIG. 16(d), IOAM-PoT-Type=1 indicates that the PoT-option-data field carries round-trip node accumulative delay information, occupying 4 bytes.

As shown in FIG. 16(e), IOAM-PoT-Type=2 indicates that the PoT-option-data field carries accumulative one-way delay field information, occupying 4 bytes.

Figure 17:
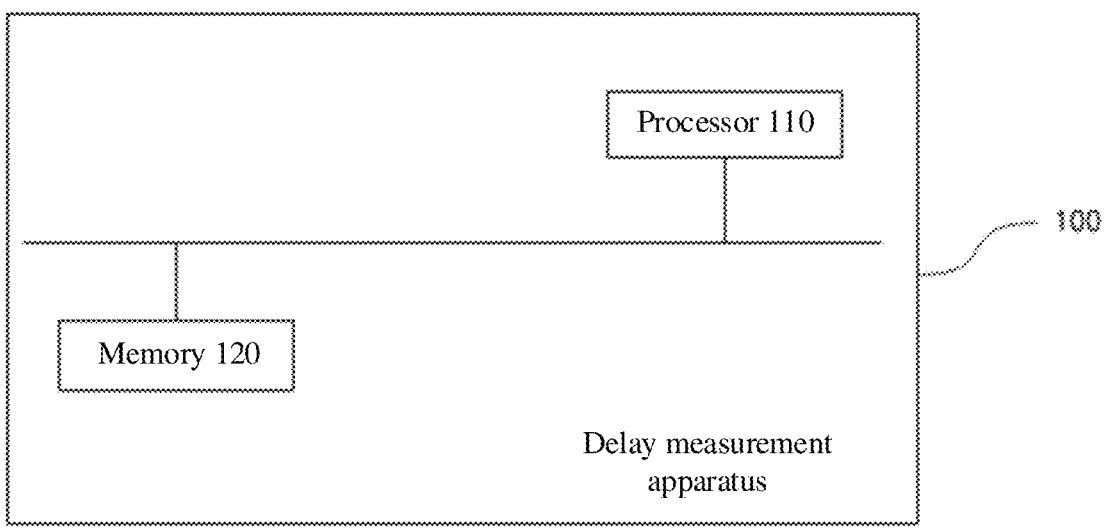
FIG. 17 is a schematic diagram of a delay measurement apparatus according to an embodiment of the present disclosure.

In addition, as shown in FIG. 17, a further embodiment of the present disclosure provides a delay measurement apparatus 100, including: at least one processor 110; at least one memory 120 for storing at least one program, where the at least one program, when executed by the at least one processor 110, causes the at least one processor to implement the delay measurement method according to any one of the previous embodiments.

In addition, a further embodiment of the present disclosure provides a computer-readable storage medium storing computer-executable instructions for performing the delay measurement method described according to any one of the previous embodiments.

Additionally, a further embodiment of the present disclosure provides a computer program product, including a computer program or computer instructions, where the computer program or the computer instructions are stored in a computer-readable storage medium, a processor of a computer device reads the computer program or the computer instructions from the computer-readable storage medium, and the computer program or the computer instructions, when executed by the processor, cause the computer device to perform the delay measurement method according to any one of the previous embodiments.

It can be understood by those of ordinary skill in the art that all or some of the steps of the methods and systems disclosed above may be implemented as software, firmware, hardware, and appropriate combinations thereof. Some or all of the physical components may be implemented as software executed by a processor, such as a central processing unit, a digital signal processor or a microprocessor, or as hardware, or as an integrated circuit, such as an application-specific integrated circuit. Such software may be distributed on computer-readable media, which may include computer-readable storage media (or non-transitory media) and communication media (or transitory media). As well known to those of ordinary skill in the art, the term computer-readable storage medium includes volatile and nonvolatile, removable and non-removable media implemented in any method or technique for storing information, such as computer-readable instructions, data structures, program modules or other data. A computer-readable storage medium includes but is not limited to a random access memory (RAM), a read-only memory (ROM), an electrically erasable programmable read-only memory (EEPROM), a flash memory or other memory techniques, a compact disc read-only memory (CD-ROM), a digital versatile disk (DVD) or other optical disk storage, a magnetic cassette, a magnetic tape, magnetic disk storage or other magnetic storage devices, or any other medium that can be used to store desired information and can be accessed by a computer. Furthermore, it is well known to those of ordinary skill in the art that communication media typically contain computer-readable instructions, data structures, program modules or other data in a modulated data signal such as a carrier wave or other transmission mechanism, and may include any information transmission media.

What is claimed is:

1. A delay measurement method, comprising:
acquiring target time information carried by a first delay measurement packet, the target time information comprising first time information filled by an intermediate node on a transmission path and second time information filled by a destination node on the transmission path, wherein the first time information is used to acquire a residence time of the first delay measurement packet at the intermediate node, and the second time information is used to acquire a residence time of the first delay measurement packet at the destination node;

acquiring an accumulative one-way link delay from a source node to the destination node according to the first time information and the second time information; and
transmitting a second delay measurement packet comprising the accumulative one-way link delay to the destination node, so that the destination node acquires a one-way delay from the source node to the destination node according to the accumulative one-way link delay;
wherein the transmitting a second delay measurement packet comprising the accumulative one-way link delay to the destination node so that the destination node acquires a one-way delay from the source node to the destination node according to the accumulative one-way link delay comprises:
generating a second delay measurement packet comprising an accumulative delay field;
filling the accumulative one-way link delay into the accumulative delay field;
transmitting the second delay measurement packet comprising the accumulative delay field to the destination node, so that the destination node acquires a one-way delay from the source node to the destination node according to information in the accumulative delay field, wherein a residence time of the second delay measurement packet is accumulated, by a node on the transmission path, into the accumulative delay field in response to the second delay measurement packet residing in the node.

2. The delay measurement method of claim 1, wherein the acquiring target time information carried by a first delay measurement packet comprises:
transmitting the first delay measurement packet comprising a loopback flag to the destination node;
receiving the first delay measurement packet returned by the destination node according to the loopback flag, wherein the first time information is filled by the intermediate node into the first delay measurement packet in response to the first delay measurement packet residing in the intermediate node on the transmission path and the second time information is filled by the destination node into the first delay measurement packet in response to the first delay measurement packet residing in the destination node on the transmission path; and
acquiring the target time information comprising the first time information and the second time information from the first delay measurement packet.

3. The delay measurement method of claim 2, wherein the target time information further comprises a first transmit timestamp and a first reception timestamp filled by the source node; and
the acquiring the target time information comprising the first time information and the second time information from the first delay measurement packet comprises:
acquiring, from the first delay measurement packet, the target time information comprising the first time information, the second time information, the first transmit timestamp, and the first reception timestamp.

4. The delay measurement method of claim 3, wherein the acquiring an accumulative one-way link delay from a source node to the destination node according to the first time information and the second time information comprises:
acquiring the accumulative one-way link delay from the source node to the destination node according to the first time information, the second time information, the first transmit timestamp, and the first reception timestamp.

5. The delay measurement method of claim 4, wherein the first time information comprises a first ingress timestamp and a first egress timestamp, and the second time information comprises a second ingress timestamp and a second egress timestamp; and the acquiring the accumulative one-way link delay from the source node to the destination node according to the first time information, the second time information, the first transmit timestamp, and the first reception timestamp comprises:

calculating the accumulative one-way link delay from the source node to the destination node according to a difference between the first egress timestamp and the first ingress timestamp, a difference between the second egress timestamp and the second ingress timestamp, and a difference between the first reception timestamp and the first transmit timestamp.

6. The delay measurement method of claim 1, wherein the source node stores a second transmit timestamp when transmitting the first delay measurement packet and a second reception timestamp when receiving the first delay measurement packet; and the acquiring an accumulative one-way link delay from a source node to the destination node according to the first time information and the second time information comprises:

acquiring the second transmit timestamp and the second reception timestamp; and acquiring the accumulative one-way link delay from the source node to the destination node according to the second transmit timestamp, the second reception timestamp, the first time information, and the second time information.

7. The delay measurement method of claim 6, wherein the first time information comprises a third ingress timestamp and a third egress timestamp, and the second time information comprises a fourth ingress timestamp and a fourth egress timestamp; and the acquiring the accumulative one-way link delay from the source node to the destination node according to the second transmit timestamp, the second reception timestamp, the first time information, and the second time information comprises:

calculating the accumulative one-way link delay from the source node to the destination node according to a difference between the second reception timestamp and the second transmit timestamp, a difference between the third egress timestamp and the third ingress timestamp, and a difference between the fourth egress timestamp and the fourth ingress timestamp.

8. The delay measurement method of claim 1, wherein the first delay measurement packet and the second delay measurement packet are both an Operation, Administration and Maintenance (OAM) protocol measurement packet, the OAM protocol measurement packet comprises a measurement type flag field, and when the measurement type flag field is set to a first preset value, the OAM protocol measurement packet is configured as the first delay measurement packet; and when the measurement type flag field is set to a second preset value, the OAM protocol measurement packet is configured as the second delay measurement packet.

9. The delay measurement method of claim 8, wherein the OAM protocol measurement packet further comprises an ingress timestamp field and an egress timestamp field, wherein the ingress timestamp field is used for filling in a timestamp in response to the OAM protocol measurement packet being received, and the egress timestamp field is used for filling in a timestamp in response to the OAM protocol measurement packet being transmitted.

10. The delay measurement method of claim 8, wherein the OAM protocol measurement packet further comprises a residence time field, and the residence time field is used for filling in the residence time of the OAM protocol measurement packet in a node.

11. The delay measurement method of claim 1, wherein the acquiring an accumulative one-way link delay from a source node to the destination node according to the first time information and the second time information comprises:

transmitting the first time information and the second time information to a network controller, so that the network controller acquires the accumulative one-way link delay from the source node to the destination node according to the first time information and the second time information.

12. The delay measurement method of claim 1, wherein the transmitting a second delay measurement packet comprising the accumulative one-way link delay to the destination node so that the destination node acquires a one-way delay from the source node to the destination node according to the accumulative one-way link delay comprises:

transmitting the second delay measurement packet comprising the accumulative one-way link delay to the destination node, so that the destination node transmits the accumulative one-way link delay to a network controller to acquire the one-way delay from the source node to the destination node.

13. A computer program product, comprising a computer program or computer instructions, wherein the computer program or the computer instructions are stored in a non-transitory computer-readable storage medium, a processor of a computer device reads the computer program or the computer instructions from the non-transitory computer-readable storage medium, and the computer program or the computer instructions, when executed by the processor, cause the computer device to perform the delay measurement method of claim 1.

14. A delay measurement apparatus, comprising: a memory, a processor, and a computer program stored in the memory and executable by the processor, wherein the computer program, when executed by the processor, causes the processor to perform a delay measurement method-comprising:

acquiring target time information carried by a first delay measurement packet, the target time information comprising first time information filled by an intermediate node on a transmission path and second time information filled by a destination node on the transmission path, wherein the first time information is used to acquire a residence time of the first delay measurement packet at the intermediate node, and the second time information is used to acquire a residence time of the first delay measurement packet at the destination node;

acquiring an accumulative one-way link delay from a source node to the destination node according to the first time information and the second time information; and transmitting a second delay measurement packet comprising the accumulative one-way link delay to the destination node, so that the destination node acquires a one-way delay from the source node to the destination node according to the accumulative one-way link delay;

wherein the transmitting a second delay measurement packet comprising the accumulative one-way link delay to the destination node so that the destination node acquires a one-way delay from the source node to the destination node according to the accumulative one-way link delay comprises:

generating a second delay measurement packet comprising an accumulative delay field;

filling the accumulative one-way link delay into the accumulative delay field;

transmitting the second delay measurement packet comprising the accumulative delay field to the destination node, so that the destination node acquires a one-way delay from the source node to the destination node according to information in the accumulative delay field, wherein a residence time of the second delay measurement packet is accumulated, by a node on the transmission path, into the accumulative delay field in response to the second delay measurement packet residing in the node.

15. The delay measurement method of claim 14, wherein the acquiring target time information carried by a first delay measurement packet comprises:

transmitting the first delay measurement packet comprising a loopback flag to the destination node;

receiving the first delay measurement packet returned by the destination node according to the loopback flag, wherein the first time information is filled by the intermediate node into the first delay measurement packet in response to the first delay measurement packet residing in the intermediate node on the transmission path and the second time information is filled by the destination node into the first delay measurement packet in response to the first delay measurement packet residing in the destination node on the transmission path; and acquiring the target time information comprising the first time information and the second time information from the first delay measurement packet.

16. The delay measurement apparatus of claim 15, wherein the target time information further comprises a first transmit timestamp and a first reception timestamp filled by the source node; and the acquiring the target time information comprising the first time information and the second time information from the first delay measurement packet comprises:

acquiring, from the first delay measurement packet, the target time information comprising the first time information, the second time information, the first transmit timestamp, and the first reception timestamp.

17. The delay measurement apparatus of claim 16, wherein the acquiring an accumulative one-way link delay from a source node to the destination node according to the first time information and the second time information comprises:

acquiring the accumulative one-way link delay from the source node to the destination node according to the first time information, the second time information, the first transmit timestamp, and the first reception timestamp.

18. The delay measurement apparatus of claim 17, wherein the first time information comprises a first ingress timestamp and a first egress timestamp, and the second time information comprises a second ingress timestamp and a second egress timestamp; and the acquiring the accumulative one-way link delay from the source node to the destination node according to the first time information, the second time information, the first transmit timestamp, and the first reception timestamp comprises:

calculating the accumulative one-way link delay from the source node to the destination node according to a difference between the first egress timestamp and the first ingress timestamp, a difference between the second egress timestamp and the second ingress timestamp, and a difference between the first reception timestamp and the first transmit timestamp.

19. A non-transitory computer-readable storage medium, storing computer-executable instructions configured to cause a computer to perform a delay measurement method comprising:

acquiring target time information carried by a first delay measurement packet, the target time information comprising first time information filled by an intermediate node on a transmission path and second time information filled by a destination node on the transmission path, wherein the first time information is used to acquire a residence time of the first delay measurement packet at the intermediate node, and the second time information is used to acquire a residence time of the first delay measurement packet at the destination node;

acquiring an accumulative one-way link delay from a source node to the destination node according to the first time information and the second time information; and transmitting a second delay measurement packet comprising the accumulative one-way link delay to the destination node, so that the destination node acquires a one-way delay from the source node to the destination node according to the accumulative one-way link delay;

wherein the transmitting a second delay measurement packet comprising the accumulative one-way link delay to the destination node so that the destination node acquires a one-way delay from the source node to the destination node according to the accumulative one-way link delay comprises:

generating a second delay measurement packet comprising an accumulative delay field;

filling the accumulative one-way link delay into the accumulative delay field;

transmitting the second delay measurement packet comprising the accumulative delay field to the destination node, so that the destination node acquires a one-way delay from the source node to the destination node according to information in the accumulative delay field, wherein a residence time of the second delay measurement packet is accumulated, by a node on the transmission path, into the accumulative delay field in response to the second delay measurement packet residing in the node.

* * * * *